United States Patent [19]

Wulf et al.

[11] 4,092,931

[45] June 6, 1978

[54] POSITIVE GUIDE MECHANISM FOR ROAD VEHICLES WITH NON-TURNABLE WHEELS

[75] Inventors: Helmut Wulf, Nellingen; Klaus Niemann, Weinstadt-Endersbach, both of Germany

[73] Assignee: Daimler-Benz Aktiengesellschaft, Germany

[21] Appl. No.: 664,372

[22] Filed: Mar. 5, 1976

[30] Foreign Application Priority Data

Mar. 6, 1975 Germany .............................. 2509713

[51] Int. Cl.² .............................................. B61F 9/00
[52] U.S. Cl. ................................... 104/247; 104/139; 104/242; 180/131
[58] Field of Search ...................... 104/242, 244.1, 245, 104/247, 119, 120, 139; 105/144, 145; 180/131

[56] References Cited

U.S. PATENT DOCUMENTS

| | | | |
|---|---|---|---|
| 1,840,988 | 1/1932 | Traver | 104/247 X |
| 2,090,409 | 8/1937 | Vaszin | 104/247 |
| 3,338,182 | 8/1967 | Maestrelli | 104/247 |
| 3,359,922 | 12/1967 | Mühlethaler | 104/247 |
| 3,393,762 | 7/1968 | Matson | 180/131 X |
| 3,593,667 | 7/1971 | Morris | 104/120 |
| 3,643,601 | 2/1972 | Taylor et al. | 104/119 X |
| 3,945,455 | 3/1976 | Hamada et al. | 104/247 X |

FOREIGN PATENT DOCUMENTS 1,302,861   7/1962   France ................................ 104/247

*Primary Examiner*—Randolph A. Reese
*Attorney, Agent, or Firm*—Craig & Antonelli

[57] ABSTRACT

A positive guide system for road vehicles equipped with non-deflectable rear wheels, in which guide elements are arranged at the same distance in front of and to the rear of the rear axle, as viewed in the vehicle longitudinal direction.

7 Claims, 9 Drawing Figures

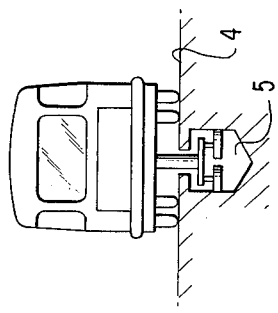
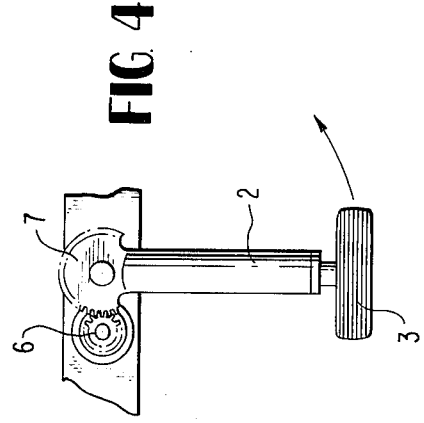
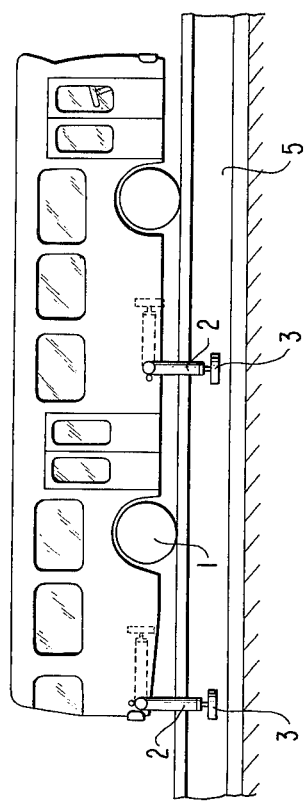
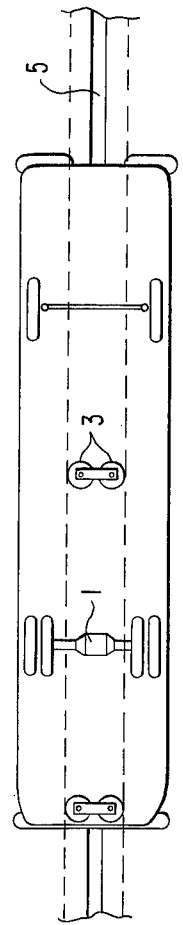

POSITIVE GUIDE MECHANISM FOR ROAD VEHICLES WITH NON-TURNABLE WHEELS

The present invention relates to a positive guide system for road vehicles with non-deflectable or non-steerable rear wheels. For purposes of driving on especially narrow and therewith cost-saving lines or tracks, for example, in the form of elevated roads or tunnel sections, motor vehicles have to be equipped with automatic steering devices. A manual steering would be possible only at very low driving velocities, in particular by reason of the unavoidable play, but also by reason of the inaccurate and non-uniform reactions of the driver on lines or routes which are only slightly wider than the vehicle itself. Finally, automatic guide installations are also a prerequisite for a driverless operation of road vehicles planned for the future.

As a result of the arrangement in prior art positive guide systems of the guide elements (as a rule, guide rollers) on the vehicle side which is inappropriate in this connection, either an oblique running angle is imposed on the rear wheels or the rear wheels have to be pivotally connected at the axle deflectable with a caster for purposes of their self-adjustment free of lateral forces. The imposed oblique running leads to lateral forces at the support tires and therewith to undesirable wear as well as unnecessary loads and stresses at the tires, axle and axle suspension.

A wheel deflection represents large constructive difficulties especially in connection with driven rear axles equipped with twin tires on each side of the axle. The constructive expenditure is additionally increased in that a blocking device for the rear wheel deflection in the straight driving position has to be provided when driving on the road with manual steering, since a vehicle with all-wheel steering becomes unstable at velocities higher than about 40 km/h. Additionally, with an adjustment of the wheels conditioned on caster and free of lateral forces, the problem of fluttering vibrations or oscillations arises which may possibly require a separate damping installation.

The present invention is therefore concerned with the task to avoid these disadvantages and to provide a particularly simple positive guidance for vehicles with non-steerable rear wheels.

This is achieved in that the guide elements according to the present invention are mounted at the same distance in front of and to the rear of the rear axle so that the rear wheels are necessarily guided free of oblique running and therewith also free of lateral forces. The guide elements are advantageously constructed as preferably lowerable and retractable rollers possibly in the form of wheels equipped with air-inflatable tires, which in their rest position do not project beyond the outer contours of the vehicle.

The arrangement of the guide elements can take place corresponding to the structural conditions of the guide tracks, with which the guide elements on the vehicle side cooperate, within the area of the center longitudinal plane of the vehicle or on both sides along the periphery thereof.

Accordingly, it is an object of the present invention to provide a positive guidance system for road vehicles with non-steerable rear wheels which avoids by simple means the aforementioned shortcomings and drawbacks encountered in the prior art.

Another object of the present invention resides in a positive guide system for road vehicles which obviates the need for imposing on the rear wheels an oblique running angle or for pivotally connecting the rear wheels with predetermined caster at the axle.

A further object of the present invention resides in a positive guidance for road vehicles with non-steerable wheels which minimizes wear as well as unnecessary stresses in the tires, axle and axle suspension of the vehicle.

Still a further object of the present invention resides in a positive guidance system for road vehicles with non-deflectable rear wheels which is simple in construction and can also be used without any constructive difficulties in connection with twin tires, driven rear axles.

These and further objects, features and advantages of the present invention will become more apparent from the following description when taken in connection with the accompanying drawings which show, for purposes of illustration only, two embodiments in accordance with the present invention, and wherein:

FIG. 1 is a partial schematic side view of one embodiment of a road vehicle with positive guide system in accordance with the present invention equipped with guide elements arranged within the area of the center longitudinal axis which cooperate with a guide installation arranged recessed in the road;

FIG. 2 is a schematic end elevational view of the embodiment of FIG. 1;

FIG. 3 is a schematic plan view of the positive guide system for the road vehicle illustrated in FIGS. 1 and 2;

FIG. 4 is a partial side elevational view, on a larger scale, illustrating the lowerable guide element on the road vehicle of FIGS. 1, 2 and 3;

Figure 6:
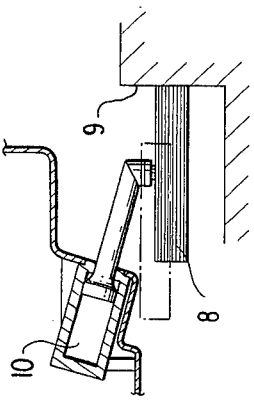
FIG. 6 is a schematic end elevation view of the road vehicle of FIG. 5 equipped with a positive guide system in accordance with the present invention.
Figure 8:
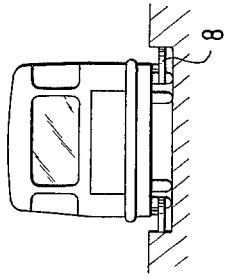
FIG. 8 is a schematic partial cross-sectional view illustrating the extending and retracting mechanism of the guide element on the road vehicle of FIGS. 5, 6 and 7.
Figure 5:
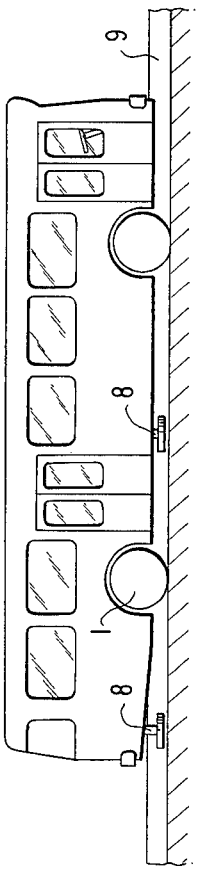
FIG. 5 is a partial schematic side view of a modified embodiment of a road vehicle provided with a positive guide system in accordance with the present invention with guide rollers arranged within the area of the periphery of the vehicle which cooperate with curb-like guide surfaces.
Figure 7:
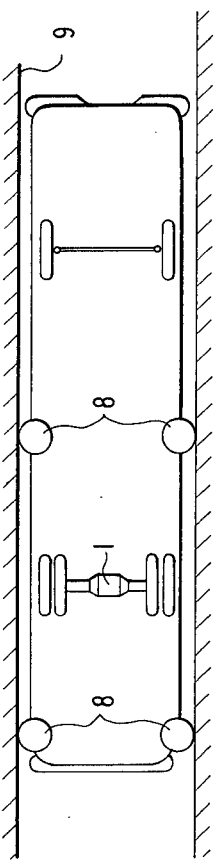
FIG. 7 is a schematic plan view of the vehicle of FIGS. 5 and 6 equipped with a positive guide system in accordance with the present invention.

The constructive realization of the positive guide system takes place in such a manner that the guide rollers are mounted at the vehicle body or at an axle part and taken over the vehicle guidance when driving over the guided road section.

Referring now to the drawing wherein like reference numerals are used throughout the various views to designate like parts, and more particularly to FIGS. 1 to 4, guide rollers 3, arranged pairwise at a lowerable keel 2, are provided respectively at the same distance in front of and to the rear of the rear axle 1 of the illustrated bus and run within a guide channel 5 recessed with respect to the road surface 4. The guide rollers 3 may thereby be constructed as wheels equipped with inflatable tires for purposes of increasing the quiet running of the vehicle. The pivoting into the extended and retracted position of the guide keel 2 may take place by way of an electric motor (not shown) which acts by way of a pinion 6 (FIG. 4) on a toothed rim 7 at the keel 2.

A modified embodiment of the present invention is illustrated in FIGS. 5 to 8, of the drawing, in which guide rollers 8 arranged pairwise and mutually opposite, are arranged again at the same distance in front and to the rear of the rear axle 1 of the illustrated bus, which in their illustrated operating position project beyond the contour of the vehicle. The guide rollers 8 cooperate with curb-like guide surfaces 9 so that the vehicle drives practically within a trough. The extension and retraction of the rollers 8 can take place, for example, hydraulically or pneumatically by way of a piston-cylinder unit 10 schematically illustrated in FIG. 8.

Figure 9:
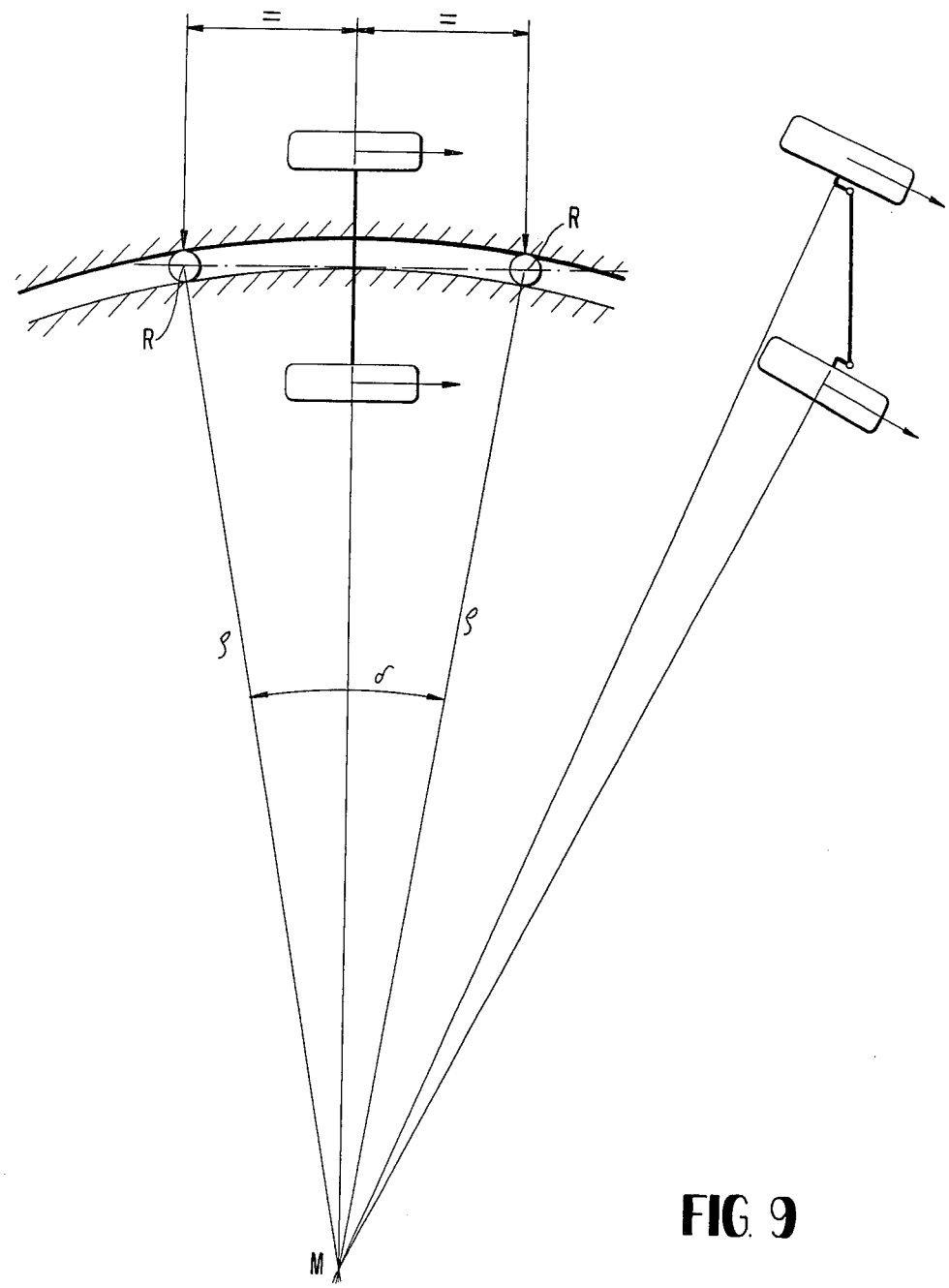
FIG. 9 is a schematic representation illustrating the geometric relationships on which the present invention is based.

The geometric conditions and relationships, on which the present invention is based, are illustrated in FIG. 9 of the drawing. More particularly, in an arrangement according to the present invention the rear axle center line points always in the direction of the curve center point M because the rear axle is located on the angle bisector of the center angle δ, which the two radius vectors ρ of the guide rollers R form with each other. The roller planes of the wheels therefore form right angles with the radii of curvature traversed by the same, i.e., run free of any oblique running. A deflection of the rear wheels for purposes of an adjustment free of lateral forces is therefore obviated in this case.

In principle, the same geometric conditions also exist if the guide rollers are not mounted in the center longitudinal plane of the vehicle but approximately in the plane of the vehicle flanks (trough guidance according to FIGS. 5 to 9).

The adjustment of the front wheels free of lateral forces can be left to the caster existing anyhow at the front axle.

The steering damping device which is already present in most cases also for the road drive, then takes care for damping any flutter vibrations.

However, the adjustment could also be realized in the curve by the relative movement of adjusting rollers additionally guided along the guide installation (slot or trough) with respect to the vehicle body.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A system comprising an unarticulated road vehicle provided with a front axle having steerable front wheels and a rear axle having non-steerable rear wheels, characterized in that a first guide means is provided for defining a path or travel of the road vehicle, a single second guide means is arranged pairwise and mutually opposite within an area of a lateral periphery of the road vehicle at least approximately at the same distance in front and to the rear of the non-steerable rear wheels as viewed in the vehicle longitudinal direction, and in that the first guide means and said single second guide means are operatively associated with each other so as to positively guide said nonsteerable rear wheels such that a rolling plane of the rear wheels is always disposed substantially at a right angle to radii of curvature of a curved path traversed by the non-steerable rear wheels whereby said rear wheels are free of oblique running and lateral forces.

2. A system according to claim 1, characterized in that the single second guide means is constructed as guide roller means.

3. A system according to claim 2, characterized in that the single second guide means is arranged so as to be extended or retracted in relation to the vehicle.

4. A system according to claim 3, characterized in that the single second guide means is adapted to be selectively pivoted out and in.

5. A system according to claim 3, characterized in that the single second guide means is arranged within an area of a vehicle center longitudinal plane.

6. A system according to claim 1, characterized in that the single second guide means is arranged within an area of a vehicle center longitudinal plane.

7. A system according to claim 1, characterized in that the single second guide means is arranged so as to be extended or retracted in relation to the vehicle.

* * * * *